United States Patent
Zangvil et al.

(10) Patent No.: US 11,086,021 B1
(45) Date of Patent: Aug. 10, 2021

(54) DUPLICATE PEAK DETECTION

(71) Applicant: Regulus Cyber Ltd., Haifa (IL)

(72) Inventors: Avner Zangvil, Ramat-HaSharon (IL); Gal Cohen, Haifa (IL); Stanislav Gutliansky, Haifa (IL); David Ramati, MaAle Shomron (IL); Yoav Zangvil, Haifa (IL)

(73) Assignee: Regulus Cyber Ltd., Haifa (IL)

( * ) Notice: Subject to any disclaimer, the term of this patent is extended or adjusted under 35 U.S.C. 154(b) by 0 days.

(21) Appl. No.: 16/910,230

(22) Filed: Jun. 24, 2020

(51) Int. Cl.
| | |
|---|---|
| *G01S 19/21* | (2010.01) |
| *G01S 19/29* | (2010.01) |
| *G01S 19/30* | (2010.01) |
| *G01S 19/22* | (2010.01) |

(52) U.S. Cl.
CPC ............ *G01S 19/215* (2013.01); *G01S 19/22* (2013.01); *G01S 19/29* (2013.01); *G01S 19/30* (2013.01)

(58) Field of Classification Search
CPC ........ G01S 19/215; G01S 19/22; G01S 19/24; G01S 19/29; G01S 19/30; G01S 19/34
See application file for complete search history.

(56) References Cited

U.S. PATENT DOCUMENTS

| | | | |
|---|---|---|---|
| 6,121,923 A | 9/2000 | King | |
| 6,707,422 B2 * | 3/2004 | Sheynblat | ............... G01S 19/20 342/357.25 |
| 7,463,188 B1 | 12/2008 | McBurney | |
| 7,605,751 B2 * | 10/2009 | Schipper | ................ G01S 19/18 342/357.58 |
| 7,924,220 B1 | 4/2011 | Lennen et al. | |
| 9,081,089 B2 * | 7/2015 | Sato | ........................ G01S 19/21 |
| 2010/0117884 A1 * | 5/2010 | Ahmed | ................... G01S 19/22 342/14 |
| 2014/0347220 A1 * | 11/2014 | Gao | ........................ G01S 19/24 342/357.68 |
| 2014/0355726 A1 | 12/2014 | Elenes et al. | |

(Continued)

FOREIGN PATENT DOCUMENTS

| | | |
|---|---|---|
| EP | 1901084 | 3/2008 |
| WO | WO 2010/105136 | 9/2010 |
| WO | WO 2020/144679 | 7/2020 |

OTHER PUBLICATIONS

Ranganathan et al. "SPREE: A Spoofing Resistant GPS Receiver." Computer Science Proceedings of the 22nd Annual International Conference on Mobile Computing and Networking. 2016. (Year: 2016).*

(Continued)

*Primary Examiner* — Gregory C. Issing

(57) ABSTRACT

A duplicate peak detector acquires and tracks a first correlation peak for a data sequence associated with a navigation satellite in a satellite navigation signal. During tracking of the first correlation peak, a second correlation peak is acquired and tracked for the same data sequence. Respective values of at least one tracking variable of the two correlation peaks are analyzed, and based on the analysis it is determined whether the first and second correlation peaks are associated with the same navigation signal or different navigation signals. If the first correlation peak and the second correlation peak are associated with the same navigation signal, tracking of one of the correlation peaks is discontinued.

20 Claims, 8 Drawing Sheets

(56) References Cited

U.S. PATENT DOCUMENTS

| | | | |
|---|---|---|---|
| 2016/0146944 A1 | 5/2016 | Geren et al. | |
| 2019/0293802 A1* | 9/2019 | Kurby | G01S 19/215 |
| 2020/0371247 A1* | 11/2020 | Marmet | G01S 19/015 |
| 2021/0072402 A1 | 3/2021 | Cohen et al. | |

OTHER PUBLICATIONS

Guo et al. "Spoofing Detection and Mitigation in a Multi-Correlator GPS Receiver Based on the Maximum Likelihood Principle." Sensors 2019, 19, 37; doi: 10.3390/s19010037 (Year: 2019).*

Jafarnia Jahromi et al. "GPS Vulnerability to Spoofing Threats and a Review of Antispoofing Techniques." Hindawi Publishing Corporation International Journal of Navigation and Observation. vol. 2012, Article ID 127072, 16 pages. (Year: 2012).*

Broumandan et al. "Spoofing Detection, Classification and Cancelation (SDCC) Receiver Architecture for a Moving GNSS Receiver." GPS Solutions (2015) 19:475-487. (Year: 2015).*

Fernandez-Prades et al. "GNSS-SDR: An Open Source Tool for Researchers and Developers." ION GNSS Conference Sep. 2011. (Year: 2011).*

International Search Report and the Written Opinion dated Mar. 22, 2020 From the International Searching Authority Re. Application No. PCT/IL2020/050024. (9 Pages).

Official Action dated Feb. 18, 2021 From the US Patent and Trademark Office Re. U.S. Appl. No. 17/099,840. (12 Pages).

* cited by examiner

DUPLICATE PEAK DETECTION

FIELD AND BACKGROUND OF THE INVENTION

Some embodiments described in the present disclosure relate to detecting satellite navigation spoofing and, more specifically, but not exclusively, to preventing tracking of duplicate correlation peaks in a satellite navigation signal.

Global Navigation Satellite System (GNSS) spoofing refers to the generation and transmission of GNSS signals in a way that causes GNSS receiver to receive them, validate them and use them to calculate and report the wrong position or time. Until recently, GNSS spoofing attacks required many resources and expensive equipment and was usually reserved for the military, other government agencies and well-funded organizations. However, in recent years software defined radios (SDR) and open-source GPS simulators have become widely available. This has led to an increasing occurrence of non-military GPS spoofing attacks.

GNSS receivers are designed to provide navigation data and typically do not have the ability to detect spoofing attacks. There are some military solutions utilizing controller radiation-pattern antenna (CRPA) technology that, by design, combat jamming attacks. Another solution is to drop satellite navigation data suspected of being spoofed and not use it to calculate the geographic location.

Fugro's Satguard™ applies a dedicated network of more than 100 reference stations world-wide to monitor the status of and data received from each individual GNSS satellite. Using Navigation Message Authentication a unique signature for each satellite is transmitted to users. By comparing the satellite data seen by the user with the data provided by Satguard™ fake satellites may be identified and discarded. Satguard™ also uses a multi-receiver technique which compares GNSS antenna geometry with known offsets. If one or more antennas depart from the expected location the system will trigger a spoofing alert. Satguard™ uses a large dedicated infrastructure of reference stations, with the attendant costs and technical difficulties of maintaining such a complex infrastructure.

Many systems rely on GNSS signals both for timing and location. As the spoofing threat is now at the hands of non-military hackers, a solution to identify and mitigate GNSS spoofing attacks is needed.

SUMMARY OF THE INVENTION

It is an object of the present invention to provide an apparatus, a system, a method and a computer program product for detecting duplicate correlation peaks in a satellite navigation system.

Some embodiments of the invention invoke simultaneous trackers on multiple correlation peaks which have been acquired for the same data sequence associated with a particular navigation satellite (e.g., a PRN code). Each of the correlation peaks is tracked separately. The trackers are aligned to identical samples. Since the trackers objects perform correlation tracking over periodic intervals aligned with the correlation peak's code shift, when a second tracker is created it is forced to align to match the first tracker. Subsequent tracking computations will then occur on aligned sample data for both trackers. In typical tracking scenarios, the tracking computations converge into narrow tracking mode, resulting in more accurate tracking data. When both trackers have converged in their computations their tracking variables are compared to check if the correlation peaks being tracked have matching tracking variables. If the tracking variables match, the correlation peaks are duplicates of the same. The tracking of duplicate peaks may be stopped, releasing tracker resources. If the tracking variables do not match, the correlation peaks are obtained from separate navigation signals and tracking may continue for both correlation peaks. The result is highly accurate matches in the case of duplicate peaks and eliminating false positives (close correlation peaks identified erroneously as duplicates).

Embodiments of the invention provide the important benefit of preventing acquisition channels from continuously acquiring duplicate signals. These channels are thus freed for acquiring and tracking new correlation peaks, enabling the acquisition of secondary signals which otherwise might not have been acquired due to the lack of available channels. Reliable detection of secondary peaks may thus be implemented efficiently, even under strict hardware limitations and high performance requirements.

According to a first aspect of some embodiments of the present invention there is provided an apparatus for preventing duplicate tracking of a satellite navigation signal. The apparatus includes processing circuitry for:

acquiring and tracking a first correlation peak for a data sequence associated with a navigation satellite in a satellite navigation signal;

during the tracking of the first correlation peak, acquiring and tracking a second correlation peak for the data sequence in the satellite navigation signal;

detecting whether the first and second correlation peaks are associated with a same navigation signal based on an analysis of respective values of at least one tracking variable of the first and second correlation peaks; and discontinuing tracking of one of the first correlation peak and the second correlation peak when the first correlation peak and the second correlation peak are associated with the same navigation signal.

According to a second aspect of some embodiments of the present invention there is provided a method for preventing duplicate tracking of a satellite navigation signal. The method includes:

acquiring and tracking a first correlation peak for a data sequence associated with a navigation satellite in a satellite navigation signal;

during the tracking of the first correlation peak, acquiring and tracking a second correlation peak for the data sequence in the satellite navigation signal;

detecting whether the first and second correlation peaks are associated with a same navigation signal based on an analysis of respective values of at least one tracking variable of the first and second correlation peaks; and discontinuing tracking of one of the first correlation peak and the second correlation peak when the first correlation peak and the second correlation peak are associated with the same navigation signal.

According to a third aspect of some embodiments of the present invention there is provided a non-transitory computer readable medium including instructions that, when executed by at least one processor, cause the at least one processor to perform operations for preventing duplicate tracking of a satellite navigation signal. The operations include:

acquiring and tracking a first correlation peak for a data sequence associated with a navigation satellite in a satellite navigation signal;

during the tracking of the first correlation peak, acquiring and tracking a second correlation peak for the data sequence in the satellite navigation signal;

detecting whether the first and second correlation peaks are associated with a same navigation signal based on an analysis of respective values of at least one tracking variable of the first and second correlation peaks; and discontinuing tracking of one of the first correlation peak and the second correlation peak when the first correlation peak and the second correlation peak are associated with the same navigation signal.

According to some implementations of the first aspect or second aspect or third aspect of the invention, tracking of both the first correlation peak and the second correlation peak is continued when the first correlation peak and the second correlation peak are associated with different navigation signals.

According to some implementations of the first aspect or second aspect or third aspect of the invention, analysis detects the first correlation peak and the second correlation peak as associated with the same navigation signal when the analysis determines that a difference between the respective tracking variables is within a specified range.

According to some implementations of the first aspect or second aspect or third aspect of the invention, the tracking of the first correlation peak and the tracking of the second correlation peak are aligned to matching data samples of the satellite navigation signal.

According to some implementations of the first aspect or second aspect or third aspect of the invention, the analysis includes comparing the respective tracking variables after convergence of the tracking of the first correlation peak and convergence of the tracking of the second correlation peak.

According to some implementations of the first aspect or second aspect or third aspect of the invention, analysis includes comparing an extrapolated value of at least one of the tracking variables of the first correlation peak with a value of the at least one tracking variable of the second correlation peak.

According to some implementations of the first aspect or second aspect or third aspect of the invention, the tracking variables comprise respective code phases of the first correlation peak and the second correlation peak.

According to some implementations of the first aspect or second aspect or third aspect of the invention, the tracking variables comprise respective Doppler frequencies of the first correlation peak and the second correlation peak.

According to some implementations of the first aspect or second aspect or third aspect of the invention, the first and second correlation peaks are associated with the same navigation signal when a difference between respective code phases of the first correlation peak and the second correlation peak is below a first threshold and a difference between respective Doppler frequencies of the first correlation peak and the second correlation peak is below a second threshold.

According to some implementations of the first aspect or second aspect or third aspect of the invention, the first and second correlation peaks are associated with the same navigation signal when a Euclidean distance between a difference between respective code phases of the first correlation peak and the second correlation peak and a difference between respective Doppler frequencies of the first correlation peak and the second correlation peak is below a third threshold.

According to some implementations of the first aspect or second aspect or third aspect of the invention, tracking of the second correlation peak is discontinued when the first correlation peak and the second correlation peak are associated with the same navigation signal.

According to some implementations of the first aspect or second aspect or third aspect of the invention, the first and second correlation peaks are associated with different navigation signals when the first and second correlation peaks have the same time of acquisition.

The foregoing and other objects are achieved by the features of the independent claims. Further implementation forms are apparent from the dependent claims, the description and the figures.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit.

As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments.

In this regard, the description taken with the drawings makes apparent to those skilled in the art how embodiments may be practiced.

DESCRIPTION OF SPECIFIC EMBODIMENTS OF THE INVENTION

Some embodiments described in the present disclosure relate to detecting satellite navigation spoofing and, more specifically, but not exclusively, to preventing tracking of duplicate correlation peaks in a satellite navigation signal.

Figure 1:
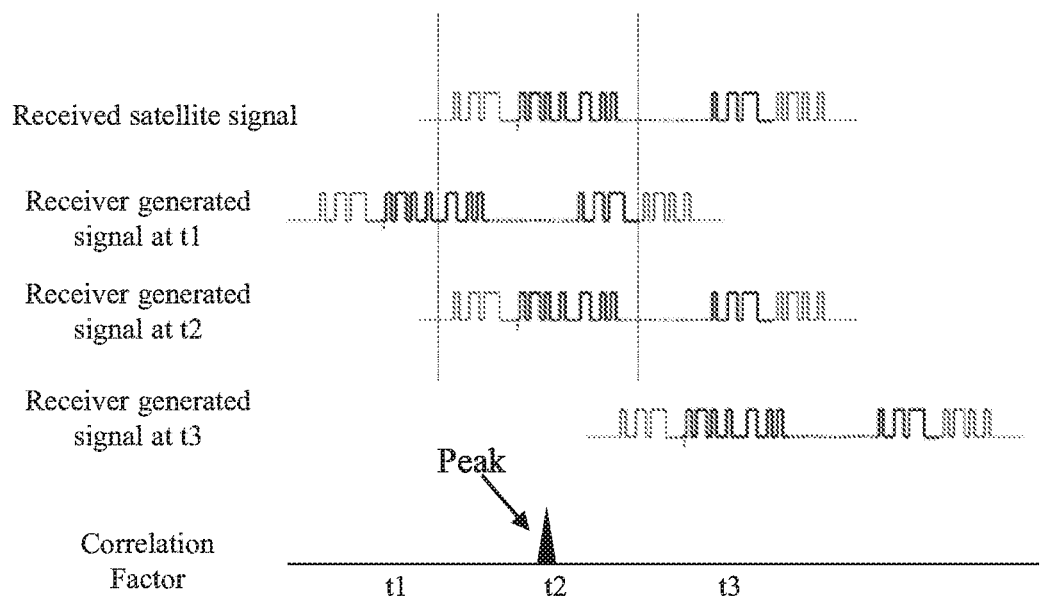
FIG. 1 illustrates searching for a correlation maximum for a PRN code.

In standard GNSS technology, a GNSS receiver searches for a signal from a navigation satellite by comparing a local copy of a PRN code to that transmitted by the satellite, as illustrated in FIG. 1. Each PRN code is associated with a specific satellite and the PRN codes of different satellites have low correlation. When a correlation is found between a particular PRN and a received satellite navigation signal, the correlation indicates that signals transmitted by the associated satellite are being received.

Figure 2:
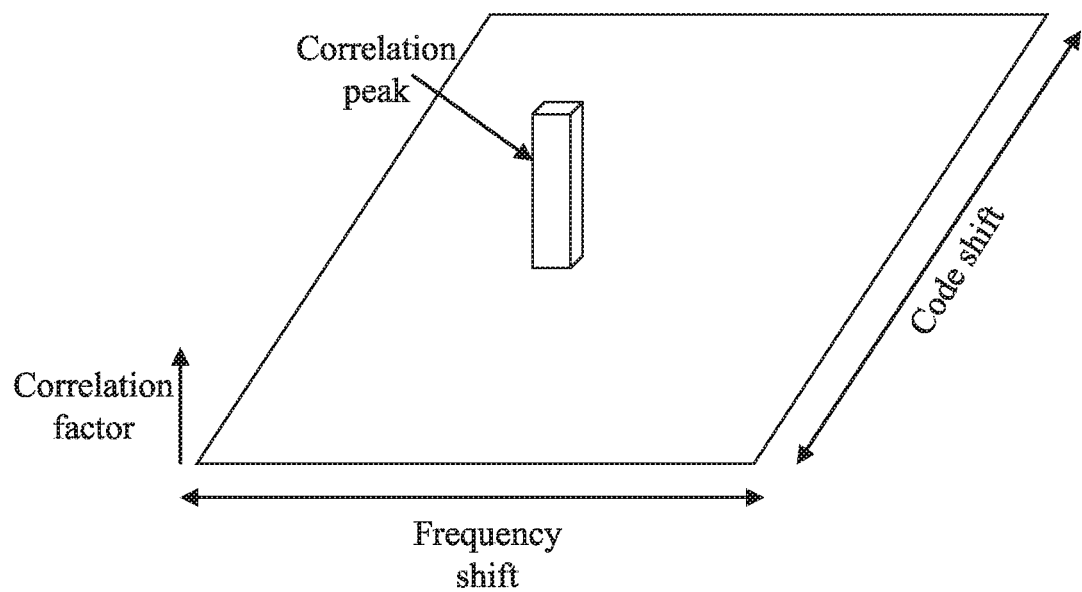
FIG. 2 is a schematic illustration of a single correlation peak.

To find a correlation peak for a particular PRN code, the GNSS receiver goes through an acquisition stage where a 2D space (Doppler shift and code shift) is searched for correlation with a local copy of the PRN code, as illustrated in FIG. 2.

During the tracking stage, the correlation maximum is sequentially searched and maintained to so that the satellite signal and the PRN sequence generated by the receiver are continually synchronous. The time-shifted PRN sequence is linked to the satellite signal. The navigation message data is reconstructed from the tracked satellite signal and used to solve the navigation equations (along with navigation message data received from other satellite transmissions).

In a typical GNSS receiver, each channel performs simultaneous computations on the RF (Radio Frequency) signal data, in the standard form of a stream of complex values in I/Q being omitted from a radio component. Each channel has two distinct modes: acquisition or tracking.

In acquisition mode, the receiver scans the signal data for correlation peaks that match the channel's assigned PRN code. Typically the peak is a candidate for acquisition if the correlation at a particular Doppler frequency and code shift is higher than a given threshold. The peak with the highest correlation value that exceeds a given threshold is then selected, and the receiver channel switches from acquisition into tracking mode.

In tracking mode, the correlation of the peak with the PRN code is tracked over time, resulting in increasingly accurate convergence of tracking variables. The tracker extracts data bits from the converging tracking data, and scans for a preamble sequence and extracts data bits into navigation messages divided into subframes (for example this cycle repeats every 30 seconds in a GPS signal). As the tracking variables converge they become increasingly accurate with each subsequent tracking cycle until they stabilize on the most accurate possible tracking (narrow tracking). If the tracking variables fail to converge due to a loss of correlation tracking, the peak is discarded and the receiver channel switches back into acquisition mode.

In GNSS receivers capable of acquiring and tracking multiple correlation peaks, the same legitimate GNSS satellite signal (i.e., a navigation signal transmitted by a GNSS satellite) may be picked up by two different trackers at different times. This is because satellite signals are weak relative to foreign signals (e.g., noise) and thus the processed GNSS signal may have inconsistencies and inaccuracies. GNSS algorithms, including acquisition and tracking, are statistical in nature because of the inconsistent nature of the RF signals. Thus the same signal may be acquired as a correlation peak at different points in time.

Another scenario in which multiple correlation peaks for the same PRN may be detected is during a GNSS spoofing attack. In some GNSS spoofing attacks, the attacker transmits a signal structured to resemble a normal GNSS signal. If the spoofed navigation signal has the same PRN code as a legitimate satellite navigation signal, multiple correlation peaks may be acquired and tracked for that PRN.

Figure 3:
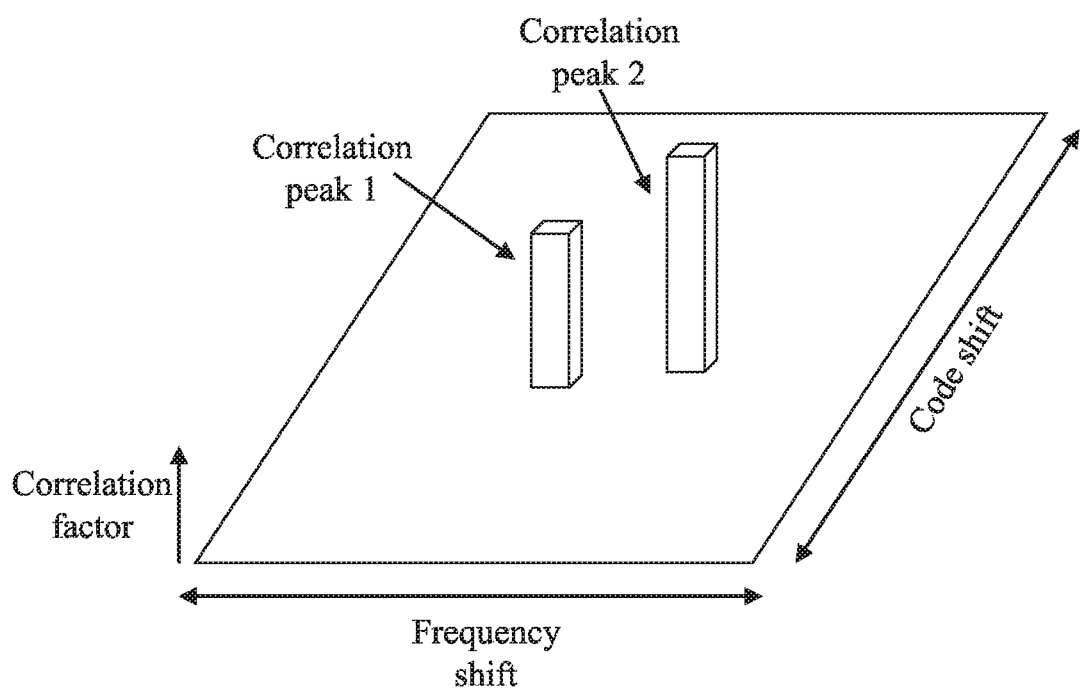
FIG. 3 is a schematic illustration of two correlation peaks detected in a satellite navigation signal for the same PRN.

FIG. 3 illustrates a scenario in which two correlation peaks with different frequency shifts and code shifts are found for a single PRN.

Figure 4:
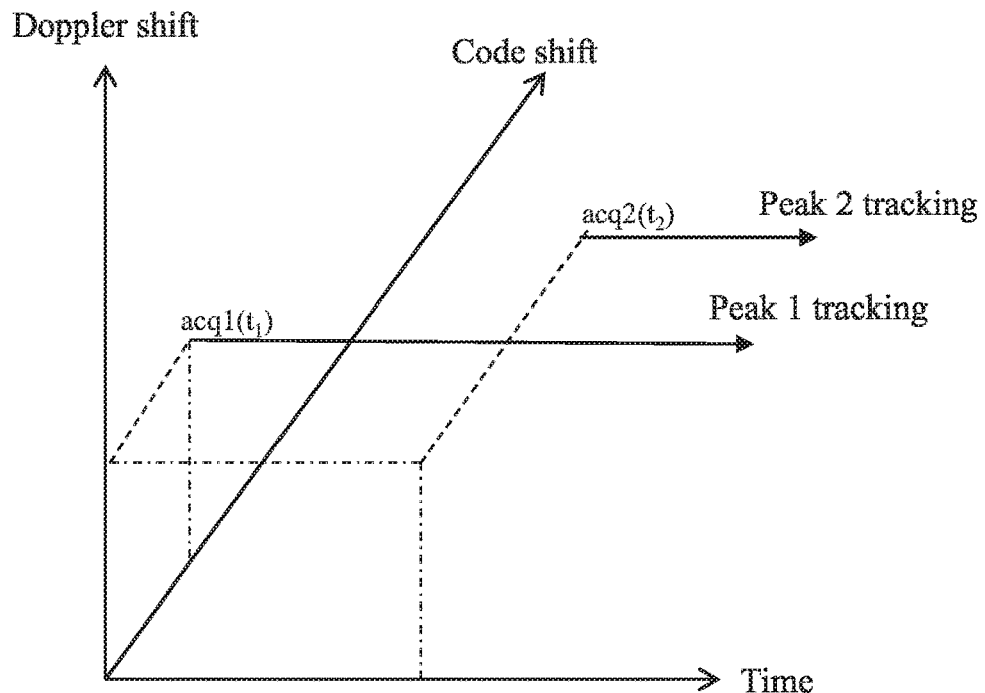
FIGS. 4, 5 and 6 are schematic illustrations of acquisition and tracking of two correlation peaks in a satellite navigation signal.
Figure 5:
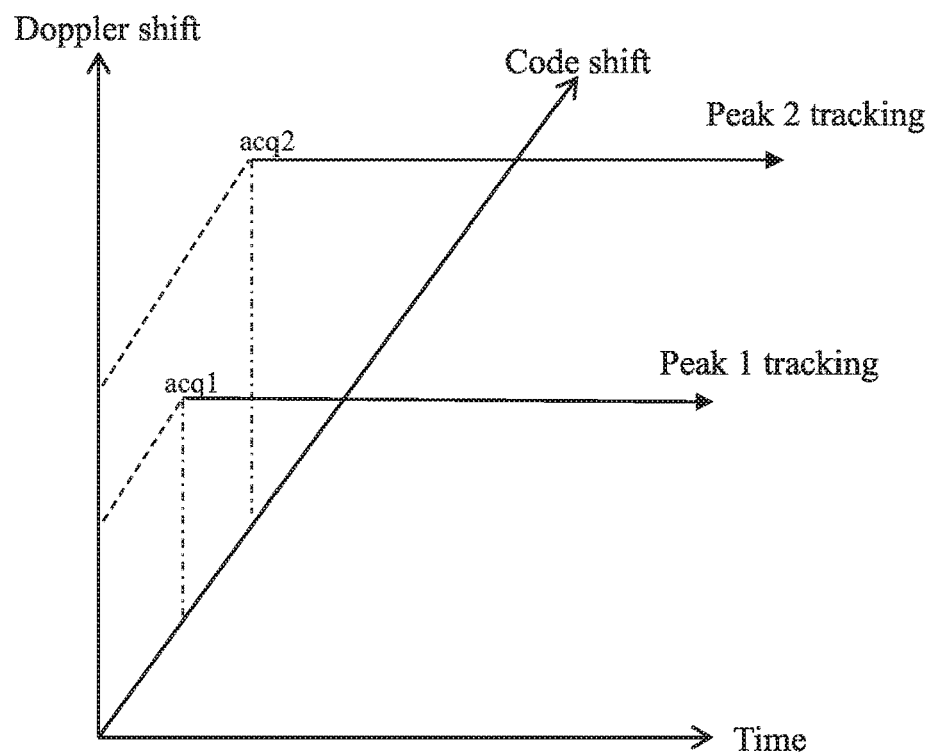
Figure 6:
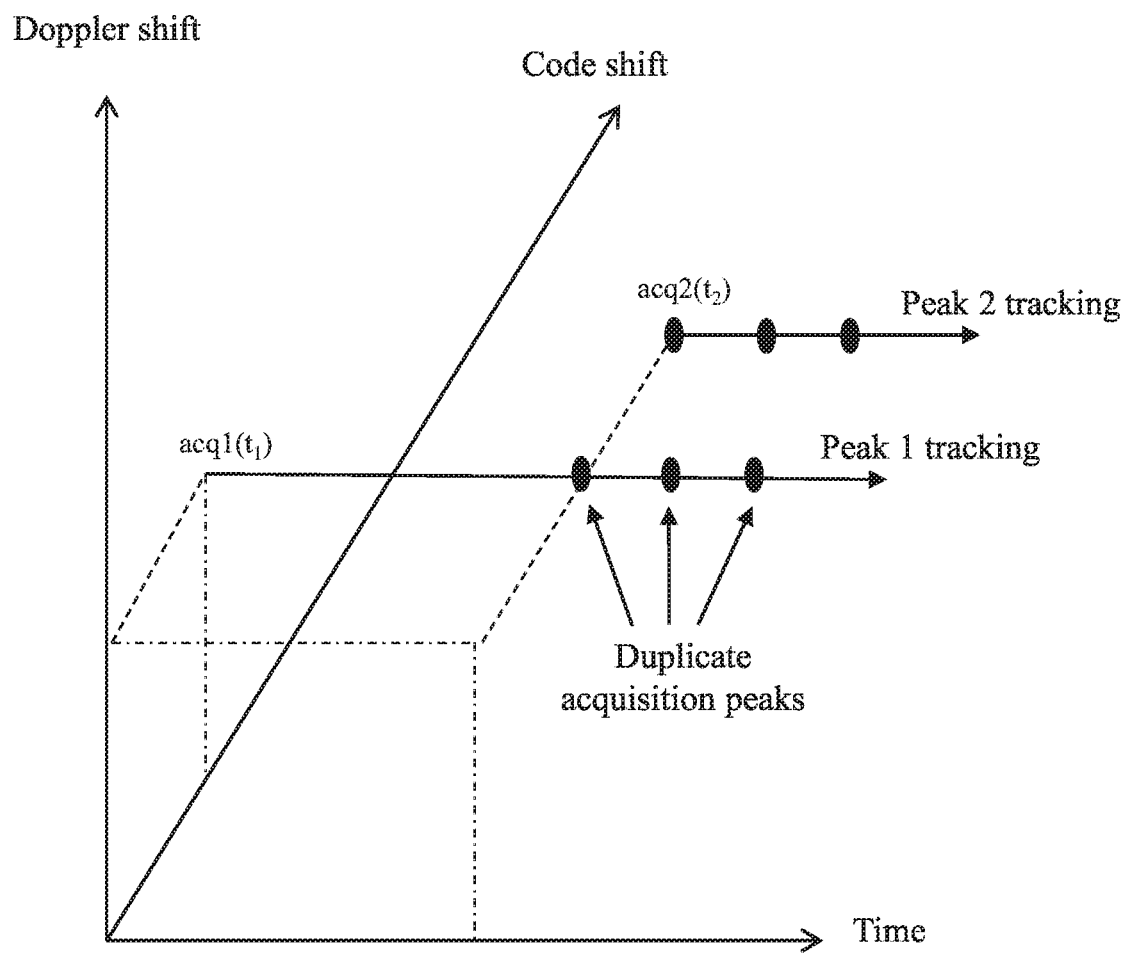

Reference is now made to FIGS. 4-6, in which two correlation peaks are acquired and tracked for the same PRN. These figures illustrate issues that may arise when duplicate peaks are detected for the same navigation signal.

FIG. 4 illustrates dual peak tracking in which two correlation peaks are acquired for the same PRN at different times ($t_1$, $t_2$) and with distinct Doppler and code shift values, $acq1(t_1)$ and $acq2(t_2)$. Subsequently tracking is invoked separately on each peak. In this scenario the two correlation peaks may result from different navigation signals or from the same navigation signal (legitimate or spoofed) acquired at different times.

FIG. 5 illustrates dual peak tracking in which two peaks with distinct Doppler and code shift values (acq1, acq2) are acquired simultaneously at $t=0$ and are tracked separately. Because the acquisition occurs simultaneously, it may be assumed the two peaks are distinct which fits a spoofing scenario.

Some high-end receivers have the ability to detect, acquire and track multiple correlation peaks. In a receiver capable of detecting multiple peaks, the receiver does not stop performing acquisition once a peak is acquired, but rather continues to perform acquisition continuously (or at a preconfigured periodic frequency defined by computational requirements) in order to scan for additional peaks. Acquisition may be configured to stop once a preconfigured number of distinct peaks is being tracked (e.g., up to two peaks tracked simultaneously). Since acquisition continues to occur in parallel to the tracking of previously acquired peaks, if a new peak is acquired from a duplicate of a navigation signal already being tracked, each of the peaks will be tracked separately by the receiver. This will quickly lead to overwhelming computational demand and preventing accurate identification of distinct correlation peaks.

FIG. 6 illustrates continuous-acquisition dual peak tracking. The two peaks are acquired at distinct times ($t_1$, $t_2$) and with distinct Doppler and code shift values, $acq1(t_1)$ and $acq2(t_2)$. When the second peak is acquired (acq2), the first peak (acq1) is reacquired. Re-acquisition of existing peaks repeats itself continuously as long as the receiver continues searching for additional peaks. This continuous acquisition and tracking of multiple correlation peaks for a single navigation signal (whether legitimate or spoofed) uses a large amount of processing resources.

Embodiments of the invention acquire and track both correlation peaks and analyze tracking variable(s) associated with each of the tracked peaks. The analysis determines whether the signals being tracked are multiple occurrences of a single satellite navigation signal (either legitimate or spoofed) or are acquired from different received signals (which indicates that a spoofing attack is taking place).

Figure 7:
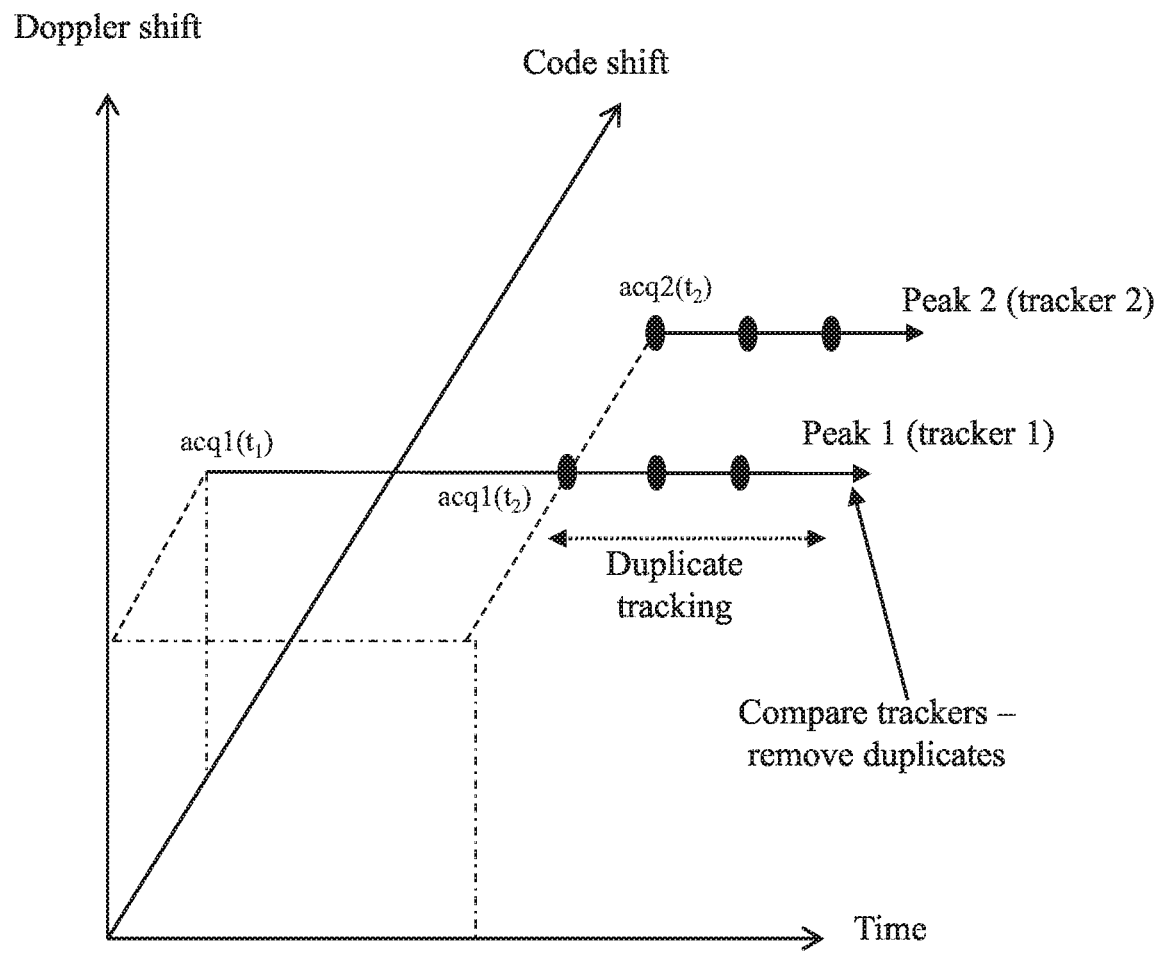
FIG. 7 is a schematic illustration of acquisition and tracking of two correlation peaks in a satellite navigation signal, according to an exemplary embodiment of the invention.

Reference is now made to FIG. 7, which illustrates dual peak tracking according to exemplary embodiments of the invention. Two correlation peaks for the same PRN are acquired at distinct times and with distinct Doppler and code shift values, $acq1(t_1)$ and $acq2(t_2)$. Tracking is initiated for each of these peaks with separate trackers, tracker 1 and tracker 2. Tracking variables for the two correlation peaks are compared at identical time points in order to decide if the two peaks represent duplicates of the same transmitted navigation signal acquired at different times or are acquired from different transmitted navigation signals (in the case of spoofing). If the trackers diverge (which fits a spoofing scenario), the two peaks are treated as distinct. If the trackers are closely aligned, one of the duplicate trackers is discarded, freeing up the channel for acquisition and tracking of new correlation peaks.

As used herein the terms "satellite navigation signal" and "navigation signal" mean a signal that is received and processed by a GNSS receiver. It is noted that during spoofing, the satellite navigation signal is not necessarily transmitted by a satellite but may be transmitted, for example, by a ground based transmitter transmitting a signal structured to resemble a normal GNSS signal.

As used herein the term "duplicate correlation peak" means a correlation peak that is acquired in a navigation signal for the same data sequence as a correlation peak that is already being tracked in the navigation signal.

As used herein, the term "tracking variable associated with a correlation peak" means a tracking variable which is calculated by tracking that correlation peak.

As used herein, the terms "respective values of a tracking variable" means the values of the same type of tracking variable for each of the tracked correlation peaks.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For the purpose of explanation, non-limiting embodiments of the invention are described herein as acquiring and tracking two correlation peaks for the same PRN and dropping a single tracked peak when a duplicate is detected. In other embodiments of the invention more than two correlation peaks are tracked for the same PRN and/or the tracking of more than one correlation peak is dropped when a duplicate is detected.

I. Duplicate Peak Detector

Figure 8:
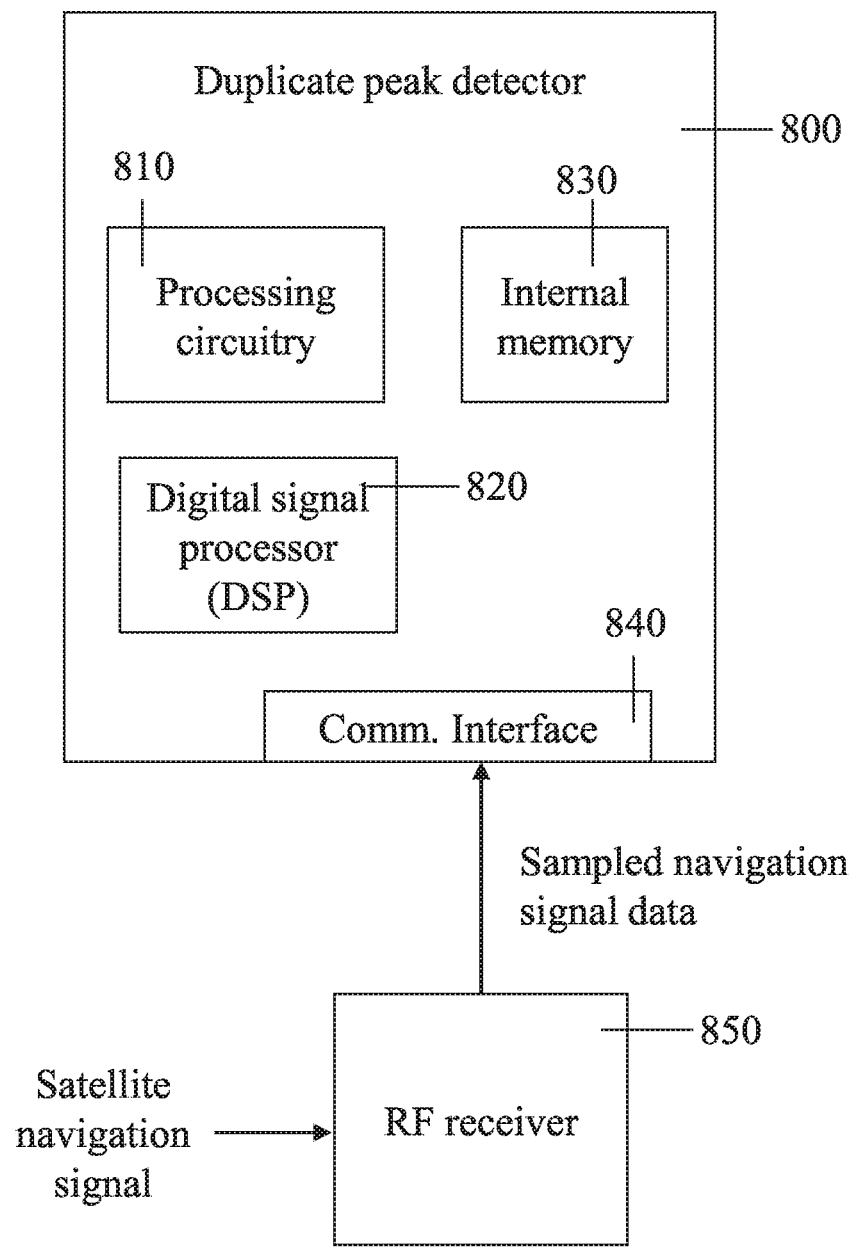
FIG. 8 is a simplified block diagram of an apparatus for duplicate peak detection in a satellite navigation signal, according to an embodiment of the invention.

Reference is now made to FIG. 8 which is a simplified block diagram of an apparatus for duplicate peak detection in a satellite navigation signal, according to an embodiment of the invention. The apparatus (denoted herein the duplicate peak detector) has the ability to acquire and track multiple correlation peaks by processing samples of a satellite navigation signal.

Duplicate peak detector 800 includes processing circuitry 810 which performs processing operations required to detect duplicate correlation peaks in a satellite navigation signal, according to any of the embodiments described herein. Processing circuitry 810 may include one or more processors and a non-transitory storage medium carrying instructions for execution, which when executed by the processing circuitry cause it to perform some or all of the tasks described herein.

Duplicate peak detector 800 acquires and tracks a first correlation peak in a satellite navigation signal for a data sequence associated with a navigation satellite (e.g., PRN). While tracking the first correlation peak, duplicate peak detector 800 continues to check for another correlation peak for the same data sequence. If a second correlation peak is acquired, the second correlation peak is tracked while continuing to track the first correlation peak.

Respective values of one or more tracking variables of the correlation peaks are analyzed in order to detect whether the first and second correlation peaks are associated with the same navigation signal or with different navigation signals. If the analysis determines that the first correlation peak and the second correlation peak are associated with the same navigation signal, tracking of one of the correlation peaks is discontinued.

Optionally, if the analysis determines the first correlation peak and the second correlation peak are associated with different navigation signals, both correlation peaks continue to be tracked.

Optionally, the analysis includes determining the difference between respective values of one or more tracking variables. If the tracking variable or variables match at a given precision level (e.g., the difference between the values is beneath a specified threshold), the trackers are considered to be tracking duplicate correlation peaks of the same navigation signal.

Optionally, the tracking variables that are analyzed are the respective code phases and/or the respective Doppler frequencies of the tracked correlation peaks. The code phase represents the code shift or offset, which is a distance that may be expressed, for example, as a radial angle, a sample counter or as a chip counter (where a chip is a single bit in a PRN sequence). The Doppler frequency may be computed initially during acquisition and its value is adjusted during tracking.

Exemplary embodiments of calculations that may be performed in order to determine if the correlation peaks are duplicates include but are not limited to:

i) Checking that the differences between the code phases and Doppler frequencies of the two correlation peaks are below respective specified thresholds.

$$|Track1.CodeShift-Track2.CodeShift|<threshold1;$$
and $$|Track1.DopplerShift-Track2.DopplerShift|<threshold2.$$

To detect a duplicate correlation peak, both values must be below a respective threshold.

ii) Comparing a mathematical function of the differences between code shifts and Doppler shifts to a single threshold. Optionally, the mathematical function is the Euclidean distance between the differences in code shifts and the difference in Doppler shifts as given below:

$$\sqrt{\begin{array}{c}(Track1.CodeShift - Track2.Codeshift)^2 + \\ (Track1.DopplerShift - Track2.DopplerShift)^2\end{array}}$$

To detect a duplicate correlation peak, this distance is compared with a single threshold.

The threshold values depend on the units used for the compared tracking variables. For example, a difference in the code shift may be expressed as a number of samples or as a radial angle.

Optionally, the tracking of the first correlation peak and the second correlation peak are aligned to matching data samples of the satellite navigation signal and the analyzed tracking variable(s) are calculated from the aligned tracked correlation peaks.

Optionally, the analysis of the tracking variable (or variables) is performed after the tracking of each of the correlation peaks has converged and the tracking variable(s) have been computed to a required degree of accuracy.

Optionally, when a duplicate correlation peak is detected, tracking of the second correlation peak is discontinued. The second correlation peak has been acquired more recently and tracked for a shorter period of time than the first correlation peak. There is a therefore a longer continuous stretch of samples of the first tracked signal, which may be used to perform positional computations in conjunction with other satellite signals in order to compute a navigational position.

Optionally, if the correlation peaks are not duplicates of the same satellite navigation signal, further analysis is performed in order to determine which peak(s) are associated with spoofed satellite navigation signals.

Optionally, spoofing is detected if two correlation peaks for the same PRN are acquired at the same time (as in FIG. 5).

Optionally, if the analysis determines that the correlation peaks are acquired from different satellite navigation signals, mitigating actions are taken in order to counteract a spoofing attack.

Optionally, multiple correlation peaks are tracked for only some of the PRNs in order to optimize processing resource allocation. The decision of which PRNs to attempt to correlate with the navigation signal may be made by any means known in the art (e.g., PRNs associated with satellites expected to be received at the current location).

In some embodiments of the invention, duplicate peak detector 800 is integrated into a GNSS receiver.

In other embodiments of the invention, duplicate peak detector 800 is not integrated into a GNSS receiver and the satellite navigation signal data is input from an external source such as a GNSS receiver or an external digital signal processor.

Optionally, the input to the processing circuitry is a sampled navigation signal provided by an RF front end (e.g., quadrature signals, IQ). Alternately or additionally, duplicate peal detector 800 includes signal processing capabilities, and some signal processing (RF and/or baseband) is performed by duplicate peak detector 800 prior to downconversion and sampling.

Optionally, duplicate peak detector 800 further includes digital signal processor (DSP) 820 which performs digital signal processing operations on the sampled navigation signal data.

Optionally, duplicate peak detector 800 includes internal memory 830 for storing processor instructions and/or navigation signal data and/or other information required for duplicate peak detection.

Optionally, duplicate peak detector 800 includes communication interface 840 which inputs sampled navigation signal data from an RF receiver.

Embodiments of the duplicate peak detector described herein include but are not limited to:

1) An IP core in a GNSS chip, such as an Application-Specific Integrated Circuit (ASIC), field-programmable gate array (FPGA) or complex programmable logic device (CPLD), (optionally using programmed in instructions in a hardware description language and/or firmware that runs on such hardware);
2) Processing circuitry integrated into a GNSS receiver (e.g., as part of the application layer of the GNSS receiver);
3) A processor and/or processing circuitry of a computer running a software-based GNSS receiver (optionally programmed in API/SDK for a host operating system such as RTOS, tinyOS, iOS, Android, VxWorks, Linux, macOS or Windows); and
4) An embedded micro-controller optionally programmed in firmware.

2. Acquisition and Tracking

Correlation peak acquisition and tracking may be performed by any means known in the art. FIG. 2 shows an embodiment in which the correlation peak is found by searching the Doppler shift and code shift 2D space for correlation with a local copy of a PRN code.

Tracking

In an exemplary embodiment, tracking of the first and second correlation peaks is performed as follows. Duplicate peak detector 800 performs computations on sample data originating from a live source such as a GNSS receiver. The samples are read in order and a count of the number of samples read is maintained. Every computation occurs at a specific sample location.

Tracking computations process a sequence of samples and then increment sample counters for the next computation. When the first correlation peak is acquired and tracking begins, the sample counter of the tracking object is aligned based on the code phase of the peak and then each iteration its sample counter is incremented by a number of samples that corresponds to the length of one PRN sequence.

When the second correlation peak is acquired, tracking of the second correlation peak is initiated. The duplicate peak detector now has two tracker objects for the given PRN. The sample counters for each tracker are assumed to be different, as they are affected by both the code phase and Doppler shift obtained during acquisition. When two trackers exist for the same PRN, the tracker with a lesser sample counter is aligned by advancing its sample counter to match that of the other tracker. Both trackers proceed with their computations, proceeding with the standard tracking algorithm until both are in "narrow tracking" state, which means their variables have been accurately computed.

3. First-tier Duplicate Peak Detection

Optionally, a first tier analysis is performed before tracking of the second correlation peak is begun.

First-tier analysis performs an initial comparison of code shift and Doppler shift variables between the tracked first correlation peak and a newly acquired second correlation peak that is not yet being tracked. The first-tier analysis is performed before tracking alignment, so the code shift of the second correlation peak is interpolated according to the sample distance between the peaks. The interpolated code shift and Doppler shift values are analyzed along with the tracking variables of the first correlation peak in order to determine if the correlation peaks are duplicates of each other.

The first-tier analysis is less accurate than the analysis that is performed after both trackers have converged, due to the interpolation and because tracking of the newly acquired signal has not undergone enough tracking to become more precise. However, while the first-tier analysis may not detect many duplicate scenarios the duplicate peaks that it does detect may be dropped before tracking, thus conserving resources and increasing performance.

4. Exemplary GNSS Receiver

Figure 9:
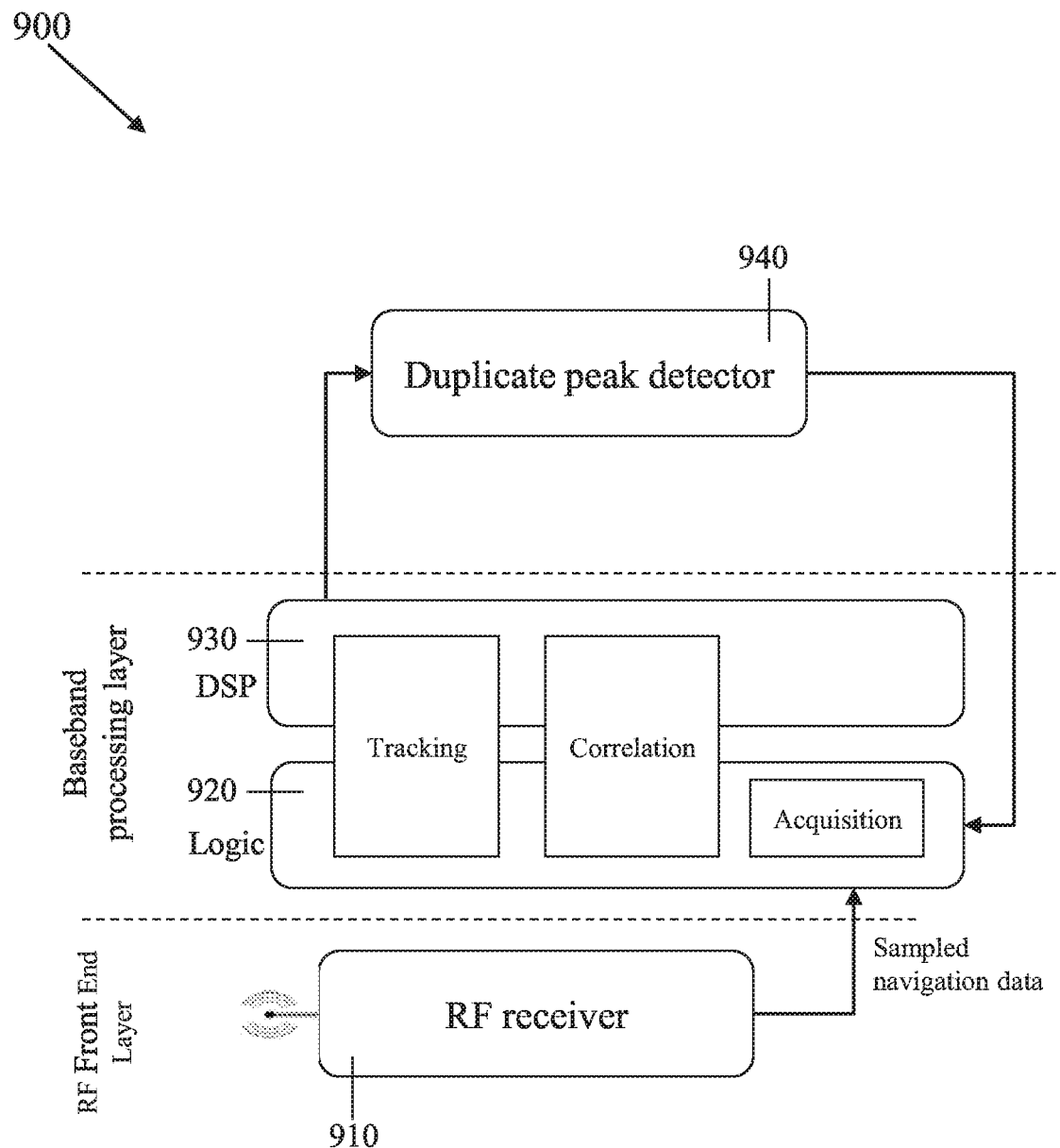
FIG. 9 is a simplified block diagram of a GNSS receiver according to an exemplary embodiment of the invention.

Reference is now made to FIG. 9, which is a simplified block diagram of a GNSS receiver according to an exemplary embodiment of the invention. GNSS receiver 900 includes four layers:

1) RF Front End Layer—includes RF front end 910 which samples the analog RF signal and converts it into sampled navigation data, optionally in the form of in-phase and quadrature data (IQ). These samples enter the baseband processing layer.
2) Baseband Processing Layer—includes logic unit 920 and DSP 930 which together perform acquisition, correlation and tracking, and provide the navigation data to duplicate peak detector 940.
3) Duplicate Peak Detector 940—detects whether correlation peaks acquired for the same PRN are duplicates acquired for the same navigation signal or are acquired from different navigation signals. Instructs the baseband processing layer when tracking of a duplicate correlation peak should be stopped.

The architecture and logic of GNSS Receiver 900:

1) Provides a sufficient number of channels in baseband to allow acquisition of the same PRN more than a single time.
2) Continues to search the Doppler shift and code shift domain for additional correlation peaks for a PRN that is already being tracked.
3) Aligns tracking of multiple correlation peaks for a PRN.
4) Analyzes tracking variables of multiple tracked peaks to detect duplicate peaks.

5. Method for Mitigating Satellite Navigation Spoofing

Figure 10:
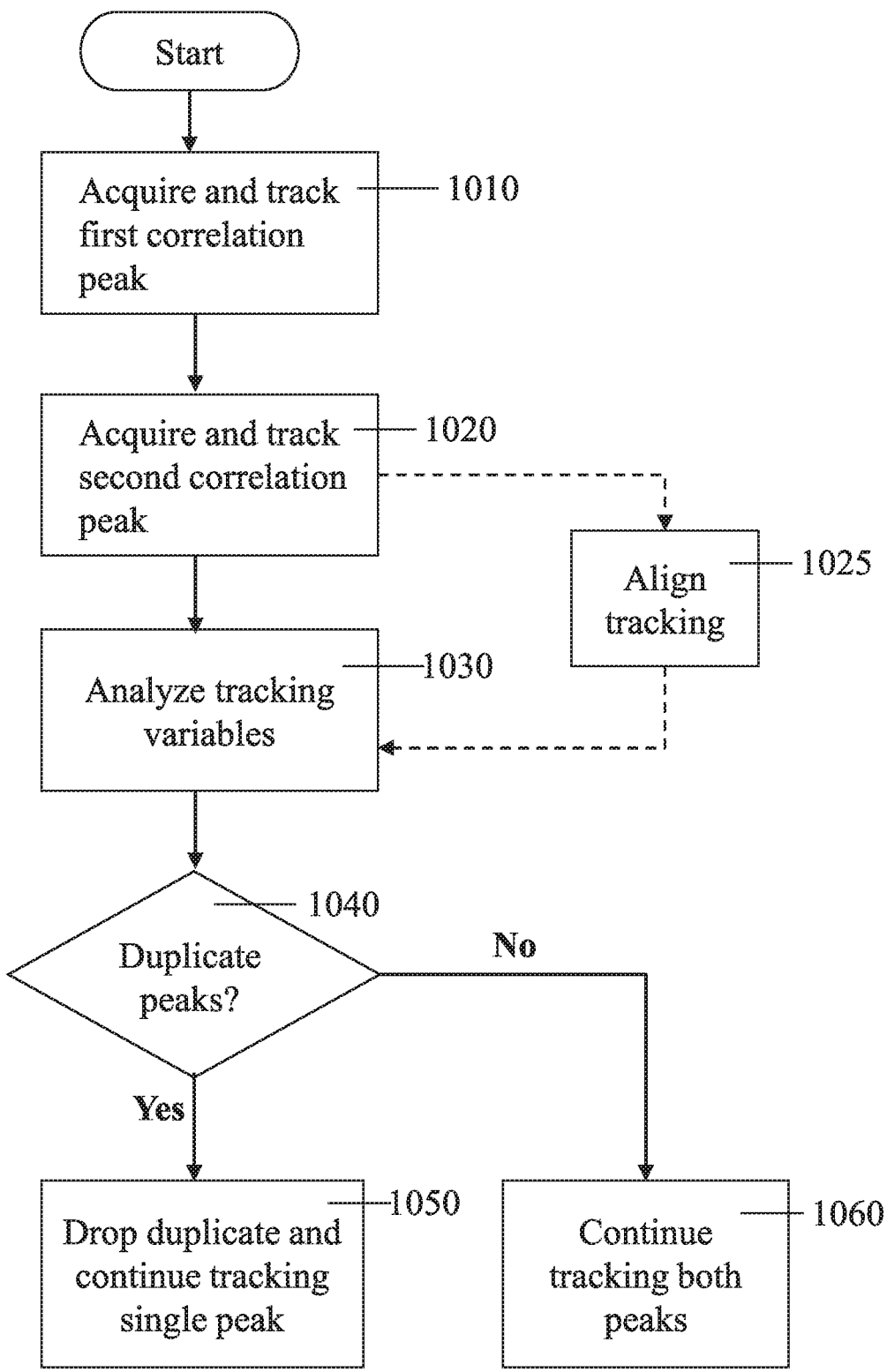
FIG. 10 is a simplified flowchart of a method for preventing duplicate tracking of a satellite navigation signal, according to embodiments of the invention.

Reference is now made to FIG. 10, which is a simplified flowchart of a method for preventing duplicate tracking of a satellite navigation signal, according to embodiments of the invention.

In 1010, a first correlation peak is acquired and tracked in a satellite navigation signal, for a data sequence associated with a navigation satellite (e.g., PRN).

In 1020, while the first correlation peak is being tracked, a second correlation peak is acquired and tracked in the satellite navigation signal for the same data sequence. Optionally, in 1025 tracking of the first correlation peak and the second correlation peak is aligned to matching data samples.

In 1030, respective tracking variables from the first and second correlation peaks are analyzed to detect whether the correlation peaks are associated with the same navigation signal or different navigational signals. Optionally, the analysis is performed after tracking of both of the correlation peaks has converged.

If duplicate correlation peaks are detected in 1040, tracking of one of the correlation peaks is discontinued in 1050. Optionally, if duplicate correlation peaks are not detected by the analysis, tracking of both correlation peaks is continued in 1060.

Optionally, the two correlation peaks are considered to be associated with the same navigation signal when the difference between respective values of the tracking parameter(s) is within a specified range.

Types of tracking variables which may be analyzed include but are not limited to:

i) Respective code phases of the correlation peaks;
ii) Respective Doppler frequencies of the correlation peaks.

In summary, the embodiments described herein provide a simple, yet highly accurate way of detecting when multiple correlation peaks being tracked for the same PRN have been acquired from the same navigation signal or from different navigation signals. Tracking of duplicate correlation peaks may be discontinued, so that only one correlation peak is tracked per received navigation signal. This frees up GNSS receiver tracking resources. False detection of spoofing attacks may be reduced by identifying and eliminating duplicate correlation peaks from the spoofing detection process.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GNSS systems, satellite navigation signals, techniques for acquiring and tracking navigation messages, digital signal processors, RF front ends, processing circuitry, GNSS receivers (hardware and software) and IP core technology will be developed and the scope of the terms GNSS, navigation signal, acquisition, tracking, digital signal processor, RF front end, processing circuitry, GNSS receiver and IP core are intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. An apparatus for preventing duplicate tracking of a satellite navigation signal, comprising:
    at least one non-transitory computer readable storage medium storing instructions; and
    at least one processor associated with said storage medium, configured to execute said instructions to:
    in samples of a radio frequency signal:
        acquire and track a first correlation peak for a data sequence associated with a navigation satellite; and
        during said tracking of said first correlation peak, acquire and track a second correlation peak for said data sequence;
    during said tracking of said first and said second correlation peaks, detect whether said first and second correlation peaks are associated with a same transmitted navigation signal based on a difference between respective code phases of said first correlation peak and said second correlation peak and a difference between respective Doppler frequencies of said of said first correlation peak and said second correlation peak; and
    discontinue tracking of one of said first correlation peak and said second correlation peak when said first correlation peak and said second correlation peak are associated with said same navigation signal and continue tracking of both said first correlation peak and said second correlation peak when said first correlation peak and said second correlation peak are associated with different navigation signals.

2. An apparatus according to claim 1, wherein said first correlation peak and said second correlation peak are associated with said same navigation signal when said difference between said respective code phases of said of said first correlation peak and said second correlation peak and said difference between said respective Doppler frequencies of said of said first correlation peak and said second correlation peak are within respective specified ranges.

3. An apparatus according to claim 1, further configured for aligning said tracking of said first correlation peak and said tracking of said second correlation peak to matching data samples of said satellite navigation signal, wherein said detecting whether said first and second correlation peaks are associated with said same navigation signal is performed on aligned navigation signal data.

4. An apparatus according to claim 1, wherein said difference between respective code phases of said of said first correlation peak and said second correlation peak and said difference between respective Doppler frequencies of said of said first correlation peak and said second correlation peak are calculated after tracking of said first correlation peak and said tracking of said second correlation peak both enter narrow tracking mode.

5. An apparatus according to claim 1, wherein said first and second correlation peaks are associated with said same navigation signal when said difference between respective code phases of said first correlation peak and said second correlation peak is below a first threshold and said difference between respective Doppler frequencies of said first correlation peak and said second correlation peak is below a second threshold.

6. An apparatus according to claim 1, wherein said first and second correlation peaks are associated with said same navigation signal when a Euclidean distance between said difference between respective code phases of said first correlation peak and said second correlation peak and said difference between respective Doppler frequencies of said first correlation peak and said second correlation peak is below a third threshold.

7. An apparatus according to claim 1, wherein said discontinuing comprises discontinuing tracking of said second correlation peak.

8. An apparatus according to claim 1, further configured for detecting that said first and second correlation peaks are associated with different navigation signals when said first and second correlation peaks have a same time of acquisition.

9. A method for preventing duplicate tracking of a satellite navigation signal, comprising:
    in samples of a radio frequency signal:
        acquiring and tracking a first correlation peak for a data sequence associated with a navigation satellite; and
        during said tracking of said first correlation peak, acquiring and tracking a second correlation peak for said data sequence;

during said tracking of said first and said second correlation peaks, detecting whether said first and second correlation peaks are associated with a same transmitted navigation signal based on a difference between respective code phases of said of said first correlation peak and said second correlation peak and on a difference between respective Doppler frequencies of said of said first correlation peak and said second correlation peak; and discontinuing tracking of one of said first correlation peak and said second correlation peak when said first correlation peak and said second correlation peak are associated with said same navigation signal and continuing tracking of both said first correlation peak and said second correlation peak when said first correlation peak and said second correlation peak are associated with different navigation signals.

10. A method according to claim 9, wherein said first correlation peak and said second correlation peak are associated with said same navigation signal when said difference between respective code phases of said of said first correlation peak and said second correlation peak and said difference between respective Doppler frequencies of said of said first correlation peak and said second correlation peak are within respective specified ranges.

11. A method according to claim 9, further comprising aligning said tracking of said first correlation peak and said tracking of said second correlation peak to matching data samples of said satellite navigation signal, wherein said detecting whether said first and second correlation peaks are associated with said same navigation signal is performed on aligned navigation signal data.

12. A method according to claim 9, wherein said difference between respective code phases of said of said first correlation peak and said second correlation peak and said difference between respective Doppler frequencies of said of said first correlation peak and said second correlation peak are calculated after said tracking of said first correlation peak and said tracking of said second correlation peak both enter narrow tracking mode.

13. A method according to claim 9, further comprising:
calculating said difference between respective code phases of said first correlation peak and said second correlation peak and comparing said difference between said respective code phases to a first threshold;
calculating said difference between respective Doppler frequencies of said first correlation peak and said second correlation peak and comparing said difference between said respective Doppler frequencies to a second threshold; and
determining that said first and second correlation peaks are associated with said same navigation signal when said difference between said respective code phases is below said first threshold and said difference between said respective Doppler frequencies is below a second threshold.

14. A method according to claim 9, further comprising:
calculating a Euclidean distance between said difference between respective code phases of said first correlation peak and said second correlation peak and said difference between respective Doppler frequencies of said first correlation peak and said second correlation peak;
comparing said Euclidean distance to a third threshold; and determining that said first and second correlation peaks are associated with said same navigation signal when said Euclidean distance is below said third threshold.

15. A method according to claim 9, wherein said discontinuing comprises discontinuing tracking of said second correlation peak.

16. A method according to claim 9, further comprising detecting that said first correlation peak and said second correlation peak are associated with different navigation signals when said first and second correlation peaks have a same time of acquisition.

17. A non-transitory computer readable medium including instructions that, when executed by at least one processor, cause the at least one processor to perform operations for preventing duplicate tracking of a satellite navigation signal, said operations comprising:
in samples of a radio frequency signal:
acquiring and tracking a first correlation peak for a data sequence associated with a navigation satellite;
during said tracking of said first correlation peak, acquiring and tracking a second correlation peak for said data sequence associated with said navigation satellite;
during said tracking of said first and said second correlation peaks, detecting whether said first and second correlation peaks are associated with a same transmitted navigation signal based on a difference between respective code phases of said first correlation peak and said second correlation peak and of a difference between respective Doppler frequencies of said of said first correlation peak and said second correlation peak; and
discontinuing tracking of one of said first correlation peak and said second correlation peak when said first correlation peak and said second correlation peak are associated with a same navigation signal and continuing tracking of both said first correlation peak and said second correlation peak when said first correlation peak and said second correlation peak are associated with different navigation signals.

18. A non-transitory computer readable medium according to claim 17, wherein said first correlation peak and said second correlation peak are associated with said same navigation signal when said difference between respective code phases of said of said first correlation peak and said second correlation peak and said difference between respective Doppler frequencies of said of said first correlation peak and said second correlation peak are within respective specified ranges.

19. A non-transitory computer readable medium according to claim 17, wherein said first and second correlation peaks are associated with said same navigation signal when said difference between respective code phases of said first correlation peak and said second correlation peak is below a first threshold and said difference between respective Doppler frequencies of said first correlation peak and said second correlation peak is below a second threshold.

20. A non-transitory computer readable medium according to claim 17, wherein said first and second correlation peaks are associated with said same navigation signal when a Euclidean distance between said difference between respective code phases of said first correlation peak and said second correlation peak and said difference between respective Doppler frequencies of said first correlation peak and said second correlation peak is below a third threshold.

* * * * *